(12) United States Patent
Vo et al.

(10) Patent No.: US 11,015,113 B1
(45) Date of Patent: May 25, 2021

(54) WET-COATED PROPPANT AND METHODS OF MAKING AND USING SAME

(71) Applicant: Multi-Chem Group, LLC, Houston, TX (US)

(72) Inventors: Loan K. Vo, Houston, TX (US);
Philippe Prince, Pearland, TX (US);
Christopher R. Parton, Edmond, OK (US)

(73) Assignee: Multi-Chem Group, LLC, Houston, TX (US)

( * ) Notice: Subject to any disclaimer, the term of this patent is extended or adjusted under 35 U.S.C. 154(b) by 0 days.

(21) Appl. No.: 16/846,705

(22) Filed: Apr. 13, 2020

(51) Int. Cl.
*C09K 8/80* (2006.01)
*E21B 43/267* (2006.01)
*C09K 8/68* (2006.01)
*C09K 8/66* (2006.01)

(52) U.S. Cl.
CPC .............. *C09K 8/805* (2013.01); *C09K 8/665* (2013.01); *C09K 8/68* (2013.01); *E21B 43/267* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 4,000,781 A | 1/1977 | Knapp | |
| 7,874,365 B2 | 1/2011 | East, Jr. et al. | |
| 8,136,595 B2 | 3/2012 | Weaver et al. | |
| 8,443,885 B2 | 5/2013 | Rickman et al. | |
| 8,555,973 B2 | 10/2013 | Welton et al. | |
| 10,351,761 B2 * | 7/2019 | Khlestkin | C09K 8/62 |
| 2004/0261995 A1 | 12/2004 | Nguyen et al. | |
| 2005/0092489 A1 | 5/2005 | Welton et al. | |
| 2007/0036977 A1 | 2/2007 | Sinclair et al. | |
| 2007/0125716 A1 | 6/2007 | Procter et al. | |
| 2007/0187097 A1 | 8/2007 | Weaver et al. | |

(Continued)

FOREIGN PATENT DOCUMENTS

WO  2017074326 A1  5/2017

OTHER PUBLICATIONS

Foreign Communication from Related Application—International Search Report and Written Opinion of the International Searching Authority, International Application No. PCT/US2020/028244, dated Jan. 12, 2021, 10 pages.

*Primary Examiner* — Andrew Sue-Ako
(74) *Attorney, Agent, or Firm* — Conley Rose, P.C.; Rodney B. Carroll

(57) ABSTRACT

A method, comprising contacting a proppant, water, and a water external emulsion to form a mixture, wherein the water external emulsion has an organic internal phase comprising a surface modifying agent; contacting the mixture with an emulsion breaker to form a wellbore servicing fluid comprising a proppant coated with the surface modifying agent; an placing the wellbore servicing fluid in a wellbore penetrating a subterranean formation. A method comprising contacting a proppant, water, and a water external emulsion to form a first mixture, wherein the water external emulsion has an organic internal phase comprising a surface modifying agent; contacting the first mixture with an emulsion breaker to form second mixture comprising a proppant coated with the surface modifying agent; and recovering a coated proppant from the second mixture.

20 Claims, 4 Drawing Sheets

(56) References Cited

U.S. PATENT DOCUMENTS

| | | | |
|---|---|---|---|
| 2010/0044041 A1 | 2/2010 | Smith et al. | |
| 2010/0270023 A1* | 10/2010 | Dusterhoft | C09K 8/70 166/308.6 |
| 2011/0088915 A1 | 4/2011 | Stanojcic et al. | |
| 2015/0122494 A1* | 5/2015 | Vo | C09K 8/5753 166/280.2 |
| 2017/0137702 A1* | 5/2017 | Khlestkin | E21B 43/04 |
| 2019/0352559 A1* | 11/2019 | Vo | C09K 8/665 |

* cited by examiner

WET-COATED PROPPANT AND METHODS OF MAKING AND USING SAME

FIELD

This disclosure relates to wellbore servicing fluids, wellbore servicing compositions and methods of making and using same to service a wellbore. More specifically, it relates to compositions and methods for proppant delivery and treatment.

BACKGROUND

Natural resources (e.g., oil or gas) residing in a subterranean formation may be recovered by driving resources from the formation into the wellbore using, for example, a pressure gradient that exists between the formation and the wellbore, the force of gravity, displacement of the resources from the formation using a pump or the force of another fluid injected into the well or an adjacent well. Production of the fluid in the formation may be increased by hydraulically fracturing the formation. That is, a viscous fracturing fluid may be pumped down the wellbore at a rate and a pressure sufficient to form fractures that extend into the formation, providing additional pathways through which the oil or gas can flow to the well.

To maintain the fractures open when the fracturing pressures are removed, a propping agent (i.e., a proppant) may be used. Proppant packs are typically introduced into the wellbore and surrounding formation during fracturing and completion operations in order to provide a structural frame for both downhole support and fluid collection. There exists an ongoing need for compositions and methods for transportation and placement of proppants in downhole environments.

BRIEF SUMMARY

Disclosed herein is a method, including contacting a proppant, water, and a water external emulsion to form a mixture, wherein the water external emulsion has an organic internal phase including a surface modifying agent; contacting the mixture with an emulsion breaker to form a wellbore servicing fluid including a proppant coated with the surface modifying agent; and placing the wellbore servicing fluid in a wellbore penetrating a subterranean formation.

Also disclosed herein is a method including contacting a proppant, water, and a water external emulsion to form a first mixture, wherein the water external emulsion has an organic internal phase including a surface modifying agent; contacting the first mixture with an emulsion breaker to form second mixture including a proppant coated with the surface modifying agent; and recovering a coated proppant from the second mixture.

Also disclosed herein is a method including contacting water and a friction reducer to form a first mixture, contacting the first mixture with a proppant to form a second mixture; contacting the second mixture with a water external emulsion to form a third mixture, wherein the water external emulsion has an organic internal phase including a surface modifying agent; contacting the third mixture with an emulsion breaker to form a wellbore servicing fluid including a proppant coated with the surface modifying agent; and placing the wellbore servicing fluid in a wellbore penetrating a subterranean formation.

Also disclosed herein is a wellbore servicing composition, including a proppant, water, a water external emulsion, a friction reducer and an emulsion breaker, wherein the water external emulsion has an organic internal phase including a surface modifying agent.

Also disclosed herein is a wellbore servicing composition, including a proppant, water, a surface modification agent, and an emulsion breaker, wherein the emulsion breaker includes inorganic particles.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1A:
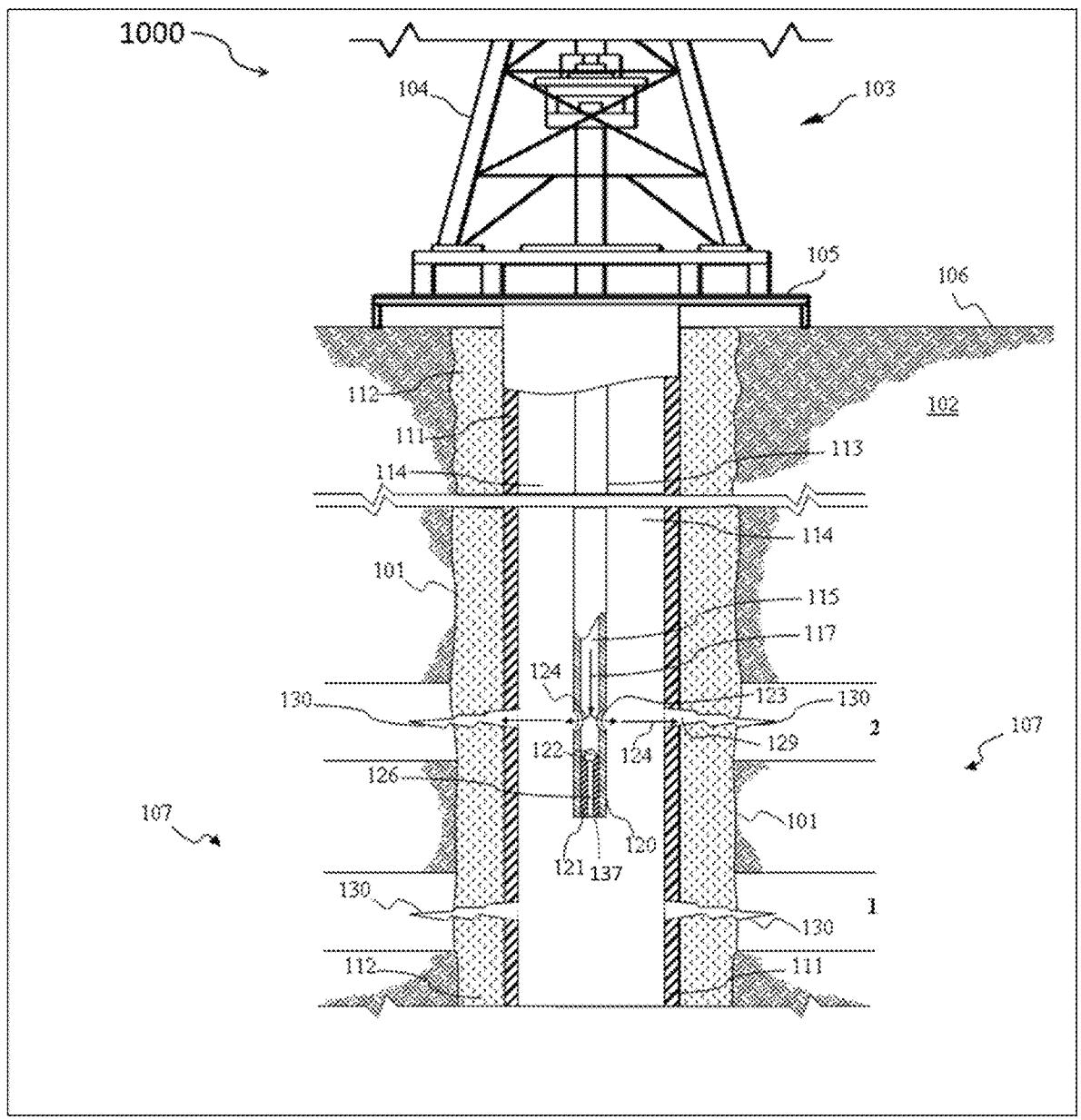
FIGS. 1A and 1B are partial cut-away views of aspects of an environment associated with a wellbore servicing operation employing a wellbore servicing fluid of the type disclosed herein and illustrating a subterranean formation stimulation operation.

It should be understood at the outset that although an illustrative implementation of one or more aspects are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are methods of preparing a coated proppant, methods of preparing a wellbore servicing fluid including a coated proppant, and methods of servicing a wellbore (e.g., hydraulic fracturing) by placing the wellbore servicing fluid including the coated proppant into the wellbore. The coated proppant can be coated with a surface modification agent (SMA) via a wet coating technique, wherein a proppant, water, a water external emulsion including the surface modification agent (SMA) (e.g., an SMA emulsion), and an emulsion breaker are contacted as described herein to yield the coated proppant and/or wellbore servicing fluid including the coated proppant. The SMA emulsion, emulsion breaker, proppant, and water components used to wet-coat the proppant with the SMA are described in more detail as follows.

The wet-coating methods disclosed herein include use of a surface modification agent (SMA) emulsion. In one or more specific aspects, the SMA emulsion is formulated as an oil-in-water or aqueous external emulsion having an aqueous external (or continuous) phase and an oil or organic internal (or discontinuous) phase. The organic internal phase includes one or more surface modifying agents and one or more organic solvents, wherein the one or more surface modifying agents are soluble in the one or more organic solvents. For example, the SMA emulsion is an aqueous external emulsion having an organic internal phase including one or more surface modifying compounds of the type disclosed herein.

Organic solvents suitable for use in forming the internal phase of the aqueous external emulsion include isopropyl alcohol, glycol ether, butyl glycidyl ether, cresol glycidyl ether, alkyl glycidyl ether, phenyl glycidyl ether or any other glycidyl ether ethyl acetate, butyl lactate, ethyl lactate, amyl acetate, ethylene glycol diacetate, propylene glycol diacetate and combinations thereof.

A surface modifying agent refers to one or more compounds that are coated onto the exterior surface of a proppant according to a wet-coating technique of the present disclosure, thereby changing one or more characteristics of the proppant (e.g., upon being placed into a proppant back in a subterranean formation). Non-limiting examples of surface modifying agents include tackifying compounds (or tackifiers), resins (or resin coatings/resin systems), or combinations thereof.

The surface modifying agent can include a non-hardening tackifying compound which can be a liquid or a solution of a compound capable of forming a non-hardening tacky coating on proppant particles. In an aspect, the surface modifying agent includes a non-aqueous tackifying agent. Alternatively, the surface modifying agent includes an aqueous tackifying agent.

In one or more specific aspects, the surface modifying agent includes a non-aqueous tackifying agent. For example, the non-aqueous tackifying agent can include polyamides that are liquids or in solution at the temperature of the subterranean formation such that they are, by themselves, non-hardening when introduced into the subterranean formation. For example and without limitation, the tackifying agent includes a condensation reaction product of commercially available polyacids and a polyamine. Such commercial products include compounds such as mixtures of $C_{36}$ dibasic acids containing some trimer and higher oligomers and also small amounts of monomer acids that are reacted with polyamines. Other polyacids suitable for use in the non-aqueous tackifying agent include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying compounds include liquids and solutions of, for example, polyesters, polycarbonates and polycarbamates, natural resins such as shellac, and the like. In an aspect, the non-aqueous tackifying agent is a dimer acid polyamide with additional amine functionality.

Non-aqueous tackifying agents suitable for use in the present disclosure may be either used such that they form non-hardening coating or they may be combined with a multifunctional material capable of reacting with the non-aqueous tackifying agent to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the non-aqueous tackifying agent may function similarly to a hardenable resin.

Multifunctional materials suitable for use in the present disclosure include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and any combination thereof.

Solvents suitable for use with the non-aqueous tackifying agents of the present disclosure include any solvent that is compatible with the non-aqueous tackifying agent and achieves the desired viscosity effect. Solvents that can be used in the present disclosure include those having high flash points (e.g., above about 125° F.). Examples of solvents suitable for use in the present disclosure include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and any combination thereof.

In one or more specific aspects, the surface modifying agent includes an aqueous tackifying agent. Aqueous tackifying agents suitable for use in the present disclosure are not significantly tacky when placed onto a particulate, but are capable of being "activated" (that is destabilized, coalesced and/or reacted) to transform the compound into a sticky, tackifying compound at a desirable time.

Solvents suitable for use with the aqueous tackifying agents of the present disclosure include any solvent that is compatible with the aqueous tackifying agent and achieves the desired viscosity effect. Examples of solvents suitable for use in the present disclosure include, but are not limited to, fresh water, salt water, brine, and sea water.

Suitable aqueous tackifying agents include any polymer that can bind, coagulate, or flocculate a particulate. Also, polymers that function as pressure sensitive adhesives may be suitable. Examples of aqueous tackifying agents suitable for use in the present disclosure include, but are not limited to acrylic acid polymers; acrylic acid ester polymers; acrylic acid derivative polymers; acrylic acid homopolymers; acrylic acid ester homopolymers (such as poly(methyl acrylate), poly (butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers, derivatives thereof, and any combination thereof. The term "derivative" as used herein refers to any compound that is made from one of the listed compounds, for example, by replacing one atom in the base compound with another atom or group of atoms.

In an aspect, the aqueous tackifying agents include at least one member selected from the group consisting of benzyl coco di-(hydroxyethyl) quaternary amine, p-T-amyl-phenol condensed with formaldehyde, and a copolymer having from about 80% to about 100% $C_{1-30}$alkylmethacrylate monomers and from about 0% to about 20% hydrophilic monomers.

In some aspects, the aqueous tackifying agent may include a copolymer that includes from about 90% to about 99.5% 2-ethylhexylacrylate and from about 0.5% to about 10% acrylic acid. Suitable hydrophilic monomers may be any monomer that will provide polar oxygen-containing or nitrogen-containing groups. Suitable hydrophilic monomers include dialkyl amino alkyl(meth)acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or alternatively acrylic acid, hydroxyethyl acrylate, acrylamide, and the like.

Alternatively, the surface modifying agent can include a hardenable resin composition. Resins suitable for use in the hardenable resin composition include any resin that is capable of forming a hardened, consolidated mass. Nonlimiting examples of hardenable resins suitable for use in the present disclosure include two component epoxy based resins, novolak resins, polyepoxides resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, water-based resins, HT epoxy-based resins, and any combination thereof.

In an aspect, the surface modifying agent includes a two-component epoxy based resin including (1) a hardenable resin component and (2) a hardening agent component. The hardenable resin component includes a hardenable resin and an optional solvent. Solvent may be added to the resin to reduce its viscosity for ease of handling, mixing and transferring. The second component is the hardening agent component, which may include (1) a hardening agent, (2) an organosilane coupling agent, (3) a surfactant, (4) an optional hydrolysable ester, and (5) an optional carrier fluid.

In an aspect, the first component of the two-component epoxy-based resin includes a hardenable resin and a solvent. Examples of suitable hardenable resins include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resin, urea-aldehyde resins, furan resins, urethane resins, a glycidyl ether resins, other epoxide resins, and any combination thereof. In some aspects, the hardenable resin includes a urethane resin. Examples of suitable urethane resins may include a polyisocyanate component and a polyhydroxy component.

Any solvent that is compatible with the hardenable resin and achieves the desired viscosity effect is suitable for use in the hardenable resin. Suitable solvents are those having high flash points (e.g., about 125 F). Such solvents include without limitation butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and any combination thereof. Other nonlimiting examples of suitable solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof.

In an aspect, the second component of the two-component epoxy-based resin includes a hardening agent, an organosilane coupling agent, a surfactant, an optional hydrolysable ester, and an optional carrier fluid.

Examples of the hardening agents that can be used in the second component of the two-component epoxy based-resin include, but are not limited to, cyclo-aliphatic amines, piperazine, derivatives of piperazine (e.g., aminoethylpiperazine), modified piperzines, aromatic amines, methylene dianiline, derivatives of methylene dianiline, hydrogenated forms of dianiline, 4,4'-diaminodiphenyl sulfone, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, ethylene diamine, diethylene triamine, triethylene tetraamine, tetraethylene pentaamine, cyclo-aliphatic amines, amides, polyamides, 2-ethyl-4-methyl imidazole, 1,1,3-trichlorotrifluoroacetone, and any combination thereof.

An organosilane coupling agent that can be used in the second component of the two-component epoxy based-resin is any organosilane coupling agent that facilitates coupling of the resin to the surface of the particulates. Examples of organosilane coupling agents suitable for use in the present disclosure include, but are not limited to, N-2-(aminoethyl)-3-aminopropyltrimethoxysilane; 3-glycidoxypropyltrimethoxysilane; γ-aminopropyltriethoxysilane; N-β-(aminoethyl)-gamma-aminopropyltrimethoxysilanes, aminoethyl-N-beta-(aminoethyl)-gamma-aminopropyl-trimethoxysilanes; γ-ureidopropyl-triethoxysilanes; β-(3-4 epoxy-cyclohexyl)-ethyl-trimethoxysilane; and γ-glycidoxypropyltrimethoxysilanes; vinyltrichlorosilane; vinyltris (β-methoxyethoxy) silane; vinyltriethoxysilane; vinyltrimethoxysilane; 3-metacryloxypropyltrimethoxysilane; β-(3,4 epoxycyclohexyl)-ethyltrimethoxysilane; r-glycidoxypropyltrimethoxysilane; r-glycidoxypropylmethylidiethoxysilane; N-β(aminoethyl)-r-aminopropyl-trimethoxysilane; N-β (aminoethyl)-r-aminopropylmethyldimethoxysilane; 3-aminopropyl-triethoxysilane; N-phenyl-r-aminopropyltrimethoxysilane; r-mercaptopropyltrimethoxysilane; Vinyltrichlorosilane; vinyltris (β-methoxyethoxy) silane; vinyltrimethoxysilane; r-metacryloxypropyltrimethoxysilane; β-(3,4-epoxycyclohexyl)-ethyltrimethoxysilane; r-glycidoxypropyltrimethoxysilane; r-glycidoxypropylmethylidiethoxysilane; N-β(aminoethyl)-r-aminopropyltrimethoxysilane; N-β(aminoethyl)-r-aminopropylmethyldimethoxysilane; r-aminopropyltriethoxysilane; N-phenyl-r-aminopropyltrimethoxysilane; r-mercaptopropyltrimethoxysilane; and combinations thereof.

A surfactant that can be used in the second component of the two-component epoxy based-resin is any surfactant compatible with the hardening agent and capable of facilitating coating of the resin onto particles. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Mixtures of one or more cationic and nonionic surfactants also may be suitable.

Nonlimiting examples of hydrolysable esters that can be used in the second component of the two-component epoxy-based resin include, but are not limited to, a mixture of dimethylglutarate, dimethyladipate, and dimethylsuccinate; sorbitol; catechol; dimethylthiolate; methyl salicylate; dimethyl salicylate; dimethylsuccinate; tert-butylhydroperoxide; and any combination thereof.

In an aspect, the second component of the two-component epoxy-based resin includes a diluent or carrier fluid. Use of a diluent or carrier fluid is optional. Any carrier fluid that is compatible with the hardening agent and achieves the desired viscosity effects is suitable for use in the present disclosure. In an aspect, the diluent or carrier fluids are those having high flash points (e.g., about 125° F.) because of, among other things, environmental and safety concerns; such solvents include without limitation butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, butyl alcohol, d'limonene, fatty acid methyl esters, and any combination thereof. Other suitable carrier fluids include aqueous dissolvable solvents such as, methanol, isopropanol, butanol, glycol ether solvents, and combinations thereof. Suitable glycol ether carrier fluids include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof.

In one or more specific aspects, the surface modifying agent includes a furan-based resin. Suitable furan-based resins include, but are not limited to furfuryl alcohol resins, mixtures of furfuryl alcohol resins and aldehydes, and mixtures of furan resins and phenolic resins. A furan-based resin may be combined with a solvent to control viscosity. Suitable solvents include, but are not limited to isopropyl alcohol, 2-butoxy ethanol, butyl lactate, butyl acetate, tetrahydrofurfuryl methacrylate, tetrahydrofurfuryl acrylate, esters of oxalic, maleic and succinic acids, and furfuryl acetate. In an aspect, the solvent is 2-butoxy ethanol.

Optionally, the furan-based resins suitable for use in the present disclosure may further include a curing agent to, among other things, facilitate or accelerate curing of the furan-based resin at lower temperatures. Examples of suitable curing agents include, but are not limited to, organic or inorganic acids, such as maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid ("DDBSA"), and combinations thereof. In those aspects where a curing agent is not used, the furan-based resin may cure autocatalytically.

In one or more specific aspects, the surface modifying agent includes a phenolic-based resin. Suitable phenolic-based resins include, but are not limited to, terpolymers of phenol, phenolic formaldehyde resins, and a mixture of phenolic and furan resins. In an aspect, the phenolic based resin is a mixture of phenolic and furan resins. A phenolic-based resin may be combined with a solvent to control viscosity. Suitable solvents include, but are not limited to butyl acetate, butyl lactate, furfuryl acetate, and 2-butoxy ethanol. In an aspect the solvent is 2-butoxy ethanol.

In one or more specific aspects, the surface modifying agent includes a high temperature (HT) epoxy-based resin. Suitable HT epoxy-based components include, but are not limited to, bisphenol A-epichlorohydrin resins, polyepoxide resins, novolak resins, polyester resins, glycidyl ethers and mixtures thereof. An HT epoxy-based resin may be combined with a solvent to control viscosity. Suitable solvents for use with the HT epoxy-based resins include, but are not limited to, dimethyl sulfoxide and dimethyl formamide. A co-solvent such as a dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene and fatty acid methyl esters, may also be used in combination with the solvent.

In one or more specific aspects, the surface modifying agent includes a phenol/phenol fornaldehyde/furfuryl alcohol resin including from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant. Suitable silane coupling agents and surfactants include those disclosed herein as suitable for use with two-component epoxy based resins.

In one or more specific aspects, the SMA may include one or more components of SANDWEDGE® Conductivity Enhancement Service commercially available from Halliburton Energy Services, for example SANDWEDGE® ABC Aqueous-Based Conductivity Enhancement Service. SANDWEDGE® ABC conductivity enhancement service is specifically designed to enhance fracture conductivity resulting from treatments with water-based fluids. In an aspect, the SMA includes one or more components of SANDWEDGE® ABC enhancer, which coats the proppant (prior to placement in the wellbore) causing it to become permanently tacky such that upon placement in downhole fractures, the tacky coating helps control intrusion of formation material (fines) into the proppant pack, reduces proppant settling and helps maintain proppant strength-all leading to improved long-term conductivity (e.g., increased porosity and permeability) of the proppant pack and surrounding formation.

In one or more specific aspects, a SMA of the type disclosed herein is contacted with the other components described herein in an amount sufficient to provide a SMA: emulsion breaker ratio of from about 100:1 to about 1:1; alternatively from about 10:1 to about 1:0.5 or alternatively from about 1:1 to 1:0.2.

In one or more specific aspects, an SMA of the type disclosed herein is present in an amount of from about 0.05 to about 10, alternatively from about 0.1 to about 5 or alternatively from about 0.1 weight percent (wt. %) to about 2.0 wt. % based on the total weight of the proppant.

The wet-coating methods disclosed herein include use of an emulsion breaker. The emulsion breaker may include an inorganic material (e.g., a particulate inorganic material) such as silica or alumina. In one or more specific aspects, the emulsion breaker includes silica, alternatively fumed silica. Herein fumed silica also known as pyrogenic silica refers to silica produced in a flame resulting in microscopic droplets of amorphous silica fused into branched, chainlike, three-dimensional secondary particles which then agglomerate into tertiary particles. In one or more specific aspects, the fumed silica for use in the wet coating methods of the present disclosure includes nanoparticles or particles having at least one size aspect less than about 1 micron. In other aspects, the emulsion breaker includes silica particles having particle sizes ranging from about 0.1 micron to about 100 microns, alternatively from about 0.1 micron to about 200 microns or alternatively from about 0.1 microns to about 250 microns.

In one or more specific aspects, the emulsion breaker is formulated as an aqueous dispersion of fumed silica. In such aspects, the emulsion breaker may be characterized by a pH of from about 3 to about 7 or alternatively from about 3 to about 5. In another aspect, the emulsion breaker may be characterized by a density of from about 1.0 $g/cm^3$ to about 1.5 $g/cm^3$, alternatively from about 1.0 $g/cm^3$ to about 1.2 $g/cm^3$. In another aspect, the emulsion breaker may be characterized by a silica content of from about 5% to about 40%, alternatively from about 10% to about 30% or alternatively from about 10% to about 15%. In another aspect, the emulsion breaker may have a viscosity of from about 10 mPa·s to about 3000 mPa·s, alternatively from 25 mPa·s to about 2500 mPa·s or alternatively from about 50 mPa·s to about 2000 mPa·s. A nonlimiting example of an emulsion breaker suitable for use in the present disclosure is AERODISP W 7512S dispersion of hydrophilic fumed silica commercially available from AERODISP.

The wet-coating methods disclosed herein include use of a proppant. For example, the proppant may include any suitable particulate material which can be used to prop open fractures extending from a wellbore into the surrounding subterranean formation, i.e., a propping agent or a proppant. When deposited in a fracture, the proppant may form a proppant pack, resulting in conductive channels through which fluids may flow to the wellbore. The proppant functions to prevent the fractures from closing due to overburden pressures.

Nonlimiting examples of proppants suitable for use in this disclosure include silica (sand), graded sand, Ottawa sands, Brady sands, Colorado sands; resin-coated sands; gravels; synthetic organic particles, nylon pellets, high density plastics, teflons, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells (including fruit pits) of seeds of fruits, plums, peaches, cherries, apricots, and the like; ground or crushed seed shells of other plants (e.g., maize, corn cobs or corn kernels); crushed fruit pits or processed wood materials, materials derived from woods, oak, hickory, walnut, poplar, mahogany, and the like, including such woods that have been processed by grinding, chipping, or other form of sizing; or any combination thereof. In one or more specific aspects, the proppant includes sand.

The proppants may be of any suitable size and/or shape. Proppant particle size may be chosen by considering a variety of factors such as the particle size and distribution of the formation sand to be screened out by the proppant. In one or more specific aspects, a proppant suitable for use in the present disclosure may have an average particle size in the range of from about 2 mesh to about 400 mesh, alternatively from about 8 mesh to about 100 mesh, or alternatively about 10 mesh to about 70 mesh, U.S. Sieve Series. The coated proppant may be present a wellbore servicing fluid in an amount of from about 0.5 wt. % to about 80 wt. %, alternatively from about 1 wt. % to about 70 wt. % or alternatively from about 2 wt. % to about 50 wt. % based on the total weight of a wellbore servicing fluid comprising the coated proppant.

The wet-coating methods disclosed herein include use of water, for example fresh water, salt-water, a brine, or brackish water. During coating of the proppant, an effective or sufficient amount of water should be included to form a proppant slurry (e.g., sand slurry) such that the other components used for coating can be thoroughly dispersed through the slurry (e.g., form a homogenous slurry via mixing in a mixer or blender). Additional water can be added to the slurry, as needed, to form a pumpable wellbore servicing fluid having fluid characteristics (e.g., density, rheology, etc.) as needed for a given wellbore servicing operation (e.g., to yield a proppant laden fracturing fluid suitable for fracturing/propping a given well of known characteristics). The water may be present in the amount from about 20 wt. % to about 98 wt. %, alternatively from about 25 wt. % to about 90 wt. % or alternatively from about 30 wt. % to about 60 wt. % based on the total weight of the wellbore servicing fluid comprising the coated proppant.

In one or more specific aspects, the SMA emulsion, proppant, water, and emulsion breaker of the type disclosed herein are used to prepare a coated proppant and/or a wellbore servicing fluid including the coated proppant. The coated proppant may be prepared by contacting an SMA emulsion, proppant, water, and emulsion breaker, each of the type disclosed herein, to form a coating mixture (also referred to as a coating composition). The contacting of the components to form the coating mixture may be carried out using any suitable mixing container, vessel or device such as a mixer or blender tub having one or more agitators such as mixing blades, impellers, etc. to impart mixing shear into the coating mixture. The contacting of the components to form the coating mixture may be carried out in any suitable order effective to yield a coated proppant and to avoid an undesirable formation (e.g., precipitation) of SMA (e.g., tackifying agent) on one or more surfaces of the mixing container or device (e.g., to avoid fouling the mixing container or device). Suitable addition or contacting sequences/orders for the components of the coating mixture include (but are not limited to) those expressly described herein, including the Example. Such contacting may be carried out at any suitable temperature and for any suitable time period to meet some user and/or process goal. In an aspect, the components of the coating mixture are combined to form a pumpable slurry including coated proppant, a pumpable coated-proppant-laden slurry including coated proppant, a pumpable wellbore servicing fluid including coated proppant, or a pumpable coated-proppant-laden wellbore servicing fluid including coated proppant, as such terms would be understood to a person of ordinary skill in the art. The coating mixture can be formulated for use "as is" as a wellbore servicing fluid (e.g., formulated to have desired fluid characteristics needed for a given wellbore servicing operation such as hydraulic fracturing a given well having known characteristics) or the coating mixture can be further adjusted/modified (e.g., via the addition of more water, one or more additives, etc.) to achieve a wellbore servicing fluid having one or more desired fluid characteristics (e.g., density, rheology, etc.). The coating mixture thus formed includes a coated proppant that may be introduced to a wellbore servicing fluid for use in wellbore servicing operations (e.g., conductivity enhancement). Alternatively, a coated proppant can be recovered from the coating mixture (e.g., via solid-liquid separation such as gravity settling, filtering, screening, centrifuge, etc.), and the coated proppant can be stored, transported (e.g., to a wellsite), etc., and the recovered coated proppant can be combined with other components (e.g., water, friction reducer, additional proppant, etc.) to form a wellbore servicing fluid.

In an aspect, a method of preparing the coated proppant includes combining the SMA emulsion, water, and proppant in any suitable order (e.g., simultaneously or sequentially) to form a coating mixture. For example, the water may be introduced to a container followed by the proppant and SMA emulsion with subsequent addition of the emulsion breaker. In another aspect, the water may be introduced to a container followed by the SMA emulsion then proppant with subsequent addition of the emulsion breaker. In another aspect, the water may be introduced to a container followed by the proppant then SMA emulsion with subsequent addition of the emulsion breaker. As noted previously, contacting of the coating mixture components can be carried out using any container and means for agitating the components contacted and for any time period suitable to form a homogeneous mixture. For example, the components of the coating mixture may be contacted in a mixer or other vessel having a means of agitation for a time period of from about 1 minute to about 24 hours.

In an aspect, a method of preparing a coated proppant of the type disclosed herein includes addition of an emulsion breaker to a mixture including at least water, an SMA emulsion and proppant. In one or more specific aspects, addition of the emulsion breaker to the water, SMA emulsion and proppant mixture is a batch process involving the introduction of a set amount of an emulsion breaker to a mixture (e.g., within a mixing vessel, blender container, etc.) including the water, SMA emulsion and proppant to form the coated proppant. In another aspect, addition of emulsion breaker to the water, SMA emulsion and proppant mixture is a continuous process where the emulsion breaker may be feed at a controlled, effective rate to a mixture (e.g., within a mixing vessel, blender container, etc.) including the water, SMA emulsion and proppant to form a coated proppant. For example, a mixture comprising water, an SMA emulsion and proppant may be formed and said mixture may be present in or conveyed to a vessel, having a means of agitation, into which is continuously fed the emulsion breaker. In either aspect, the amount of SMA and emulsion provided is sufficient to achieve the SMA:emulsion breaker ratios disclosed herein.

As will be understood by one of ordinary skill in the art, the SMA emulsion as an aqueous external emulsion has an organic internal phase comprising a SMA of the type disclosed herein (e.g., a tackifying polymer). Given that the SMA emulsion is an aqueous external emulsion, the SMA emulsion is compatible with a water-based slurry (e.g., water and proppant) and can readily disperse therein upon combination with water and proppant to form the water-based slurry. As such, the SMA is uniformly dispersed with the homogenous slurry prior to breaking of the SMA emulsion and resultant release of the SMA. In other words, the SMA solubilized within the organic solvent is substantially encased by the continuous aqueous phase that prevents the SMA from prematurely interacting with the aqueous phase of a wellbore servicing fluid such that the SMA might precipitate out and foul mixing equipment prior to being dispersed within the proppant to be coated. Once a homogenous mixture of water, proppant, and SMA emulsion is obtained, subsequent addition of the emulsion breaker to the mixture causes loss of the structural integrity of the SMA emulsion (e.g., disrupts the external aqueous phase), causing release of the organic internal phase and resultant deposition (e.g., coating) of the SMA onto the proppant surface.

In some aspects, the coating mixture used in preparation of a coated proppant includes additives for use in a resultant wellbore servicing fluid comprising the coated proppant. For example, additives, which can be used for improving or changing the properties of a wellbore servicing fluid, may be present in the coating mixture used in preparation of a coated proppant. Such additives include but are not limited to salts, accelerants, surfactants, set retarders, defoamers, settling prevention agents, weighting materials, dispersants, formation-conditioning agents, water softeners or any combination thereof. These additives may be included singularly or in combination and amounts effective to achieve some user and/or process goal. In such aspects, the coated proppant is formed in the presence of one or more additives (e.g., surfactant, dispersant) that may be used in a wellbore servicing fluid comprising the coated proppant.

In an aspect, a suitable additive is a friction reducer (also referred to as a fluid-friction reducer). Accordingly, the coating mixture and the resultant wellbore servicing fluid comprising the coated proppant may further include a friction reducer. Friction reducers are typically included in wellbore servicing fluids to reduce friction/energy requirements during pumping of a fluid and/or in order to minimize damage to the formation from fluids flowing therein (e.g., damage to formation porosity). Generally, friction reducers include aqueous solutions of a chemical additive which function to alter the fluid rheology by enhancing the viscosity and lowering the friction. In one or more specific aspects, the friction reducer includes an anionic polymer, a cationic polymer, a non-ionic polymer, an amphoteric polymer or any combination thereof. In another aspect, the friction reducer is selected from a polyacrylamide, a polyacrylamide derivative, a polyacrylamide co-polymer or any combination thereof.

In one or more specific aspects, an additive (e.g., friction reducer) is present in a wellbore servicing fluid an amount of from about 0 gpt (gallon per thousand) to about 10.0 gpt, alternatively from about 0.1 gpt to about 3.0 gpt or alternatively from about 0.2 gpt to about 0.6 gpt based on the total volume of the wellbore servicing fluid comprising a coated proppant.

The additives may be added to the coating mixture and/or subsequent wellbore servicing fluid including coated proppant at any time during contacting of the components thereof that does not otherwise interfere with the coating of the proppant by the SMA. In an aspect, the additive (e.g., friction reducer) may be added to the coating mixture prior to and/or after addition of the emulsion breaker, provided that the presence of any such additive does not interfere with the interaction of the emulsion breaker with the SMA emulsion to result in coating of the SMA on the proppant. In an aspect, the additive (e.g., friction reducer) may be added to the coating mixture prior to addition of the emulsion breaker. In an aspect, the additive (e.g., friction reducer) may be added to the coating mixture concurrent with or subsequent to addition of the emulsion breaker. In an aspect, proppant and water are contacted prior to contact with the SMA emulsion to form the coating mixture, and an additive (e.g., friction reducer) is added prior to or concurrent with contact of the proppant and the water; and subsequently the emulsion breaker is added to the coating mixture to yield a coated proppant. In an aspect, the SMA emulsion and the water are contacted prior to contact with the proppant to form the coating mixture, and an additive (e.g., friction reducer) is added prior to or concurrent with contact of the SMA emulsion and the water, and subsequently the emulsion breaker is added to the coating mixture to yield a coated proppant. In an aspect, an additive (e.g., friction reducer) is added to water to form slickwater, and proppant and/or an SMA emulsion are combined with the slickwater (e.g., either sequentially or simultaneously) to form a mixture, followed by contact of the emulsion breaker with the mixture.

In one or more specific aspects, the coating mixture including the coated proppant and other additives (e.g., friction reducer) may be used to service a wellbore (e.g., placed downhole), either "as is" or via further modification (e.g., addition of water to recovered coated proppant and/or a coated proppant slurry). In other aspects, the method includes recovering the coated proppant from the coating mixture/composition, optionally storing and/or transporting the recovered coated proppant to a wellsite, preparing a wellbore servicing fluid including the recovered coated proppant, and placing the wellbore serving fluid into a wellbore penetrating a subterranean formation to perform a wellbore serving operation (e.g., conductivity enhancement and/or hydraulic fracturing).

In the various methods disclosed herein, the proppant is coated by the SMA in situ (e.g., wet coating of the sand with the SMA within a mixing container or device such as a blender tub) thus avoiding the steps of separately coating the proppant with the SMA. For example, dry coating of the proppant with SMA utilizing devices such as a sandscrew or the use of organic solvents in coating the proppant is avoided.

In one or more specific aspects, the wellbore servicing fluid includes a sufficient amount of water to form a pumpable fluid. The water may be fresh water. Alternatively, the water may be salt water, e.g., an unsaturated aqueous salt solution or a saturated aqueous salt solution such as brine or seawater.

In the drawings and description that follow, like parts are typically marked throughout the specification and drawings with the same reference numerals, respectively. In addition, similar reference numerals may refer to similar components in different aspects disclosed herein. The drawing figures are not necessarily to scale. Certain features of the presently disclosed subject matter may be shown exaggerated in scale or in somewhat schematic form and some details of conventional elements may not be shown in the interest of clarity and conciseness. The presently disclosed subject matter is susceptible to aspects of different forms. Specific aspects are described in detail and are shown in the drawings, with the understanding that the present disclosure is not intended to limit the disclosed subject matter to the aspects illustrated and described herein. It is to be fully recognized that the different teachings of the aspects discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "up-hole," "upstream," or other like terms shall be construed as generally from the formation toward the surface or toward the surface of a body of water likewise, use of "down," "lower," "downward," "downhole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis.

Unless otherwise specified, use of the term "subterranean formation" shall be construed as encompassing both areas below exposed earth and areas below earth covered by water such as ocean or fresh water.

Figure 1B:
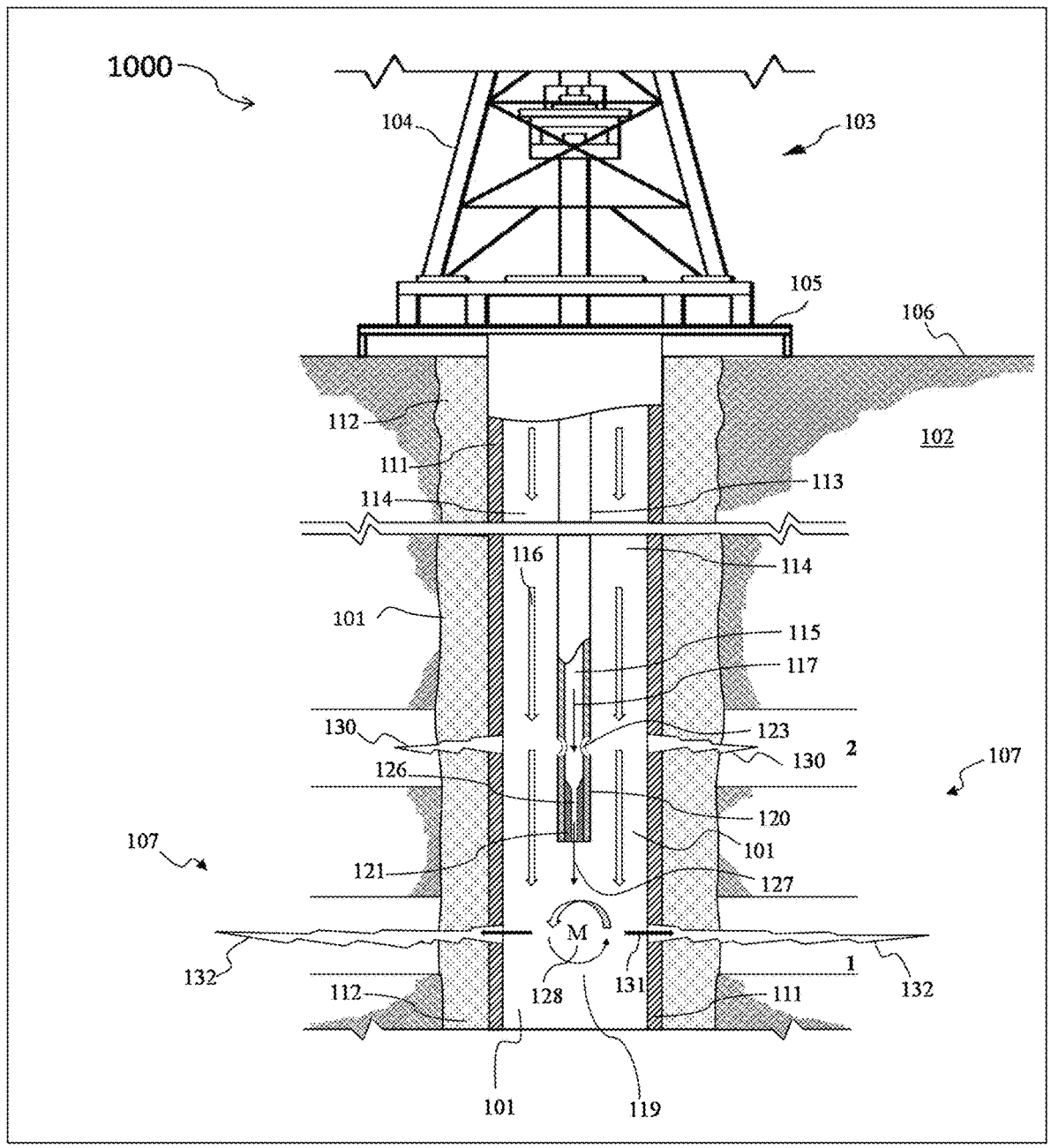

Referring to FIGS. 1A and 1B, an aspect of an operating environment in which a wellbore serving fluid including coated proppants of the type disclosed herein and associated methods may be employed is illustrated. It is noted that although some of the figures may exemplify horizontal or vertical wellbores, the principles of the methods, apparatuses, and systems disclosed herein may be similarly applicable to horizontal wellbore configurations, conventional vertical wellbore configurations, and combinations thereof. Therefore, the horizontal or vertical nature of any figure is not to be construed as limiting the wellbore to any particular configuration.

Referring to the aspect of FIGS. 1A and 1B, the operating environment generally includes a wellbore 101 that penetrates a subterranean formation 102 for the purpose of recovering hydrocarbons, storing hydrocarbons, disposing of carbon dioxide, or the like. The wellbore 101 may be drilled into the subterranean formation 102 using any suitable drilling technique. In one or more specific aspects, a drilling or servicing rig 103 includes a derrick 104 with a rig floor 105 through which a work string (e.g., a drill string, a tool string, a segmented tubing string, a jointed tubing string, a coiled tubing string, or any other suitable conveyance, or combinations thereof) generally defining an axial flowbore may be positioned within or partially within the wellbore 101. In one or more specific aspects, such a work string may include two or more concentrically positioned strings of pipe or tubing (e.g., a first work string may be positioned within a second work string). The drilling or servicing rig 103 may be conventional and may include a motor driven winch and other associated equipment for lowering the work string into the wellbore 101. Alternatively, a mobile workover rig, a wellbore servicing unit (e.g., coiled tubing units), or the like may be used to lower the work string into the wellbore 101. In such an aspect, the work string may be utilized in drilling, stimulating, completing, or otherwise servicing the wellbore.

The wellbore 101 may extend substantially vertically away from the earth's surface 106 over a vertical wellbore portion, or may deviate at any angle from the earth's surface 106 over a deviated or horizontal wellbore portion. In alternative operating environments, portions or substantially all of the wellbore 101 may be vertical, deviated, horizontal, and/or curved and such wellbore may be cased, uncased, or combinations thereof.

Referring again to FIGS. 1A and 1B, in one or more specific aspects, the wellbore 101 may be at least partially cased with a casing string 111 generally defining an axial flowbore, alternatively the wellbore 101 may be at least partially cased with a liner. In an alternative aspect, at least a portion of a wellbore, like wellbore 101, may remain uncased. The casing string 111 may be secured into position within the wellbore 101 in a conventional manner with cement 112, alternatively, the casing string 111 may be partially cemented within the wellbore, or alternatively, the casing string may be uncemented. For example, in an alternative aspect, a portion of the wellbore 101 may remain uncemented, but may employ one or more packers (e.g., mechanical packers or swellable packers) to secure the casing string 111 within the wellbore 101 and/or to isolate two or more adjacent portions, zones, or stages within the wellbore 101. In one or more specific aspects, where the casing string includes a liner, the liner may be positioned within a portion of the wellbore 101, for example, lowered into the wellbore 101 suspended from the work string. In such an aspect, the liner may be suspended from the work string by a liner hanger or the like. Such a liner hanger may include any suitable type or configuration of liner hanger, as will be appreciated by one of skill in the art with the aid of this disclosure.

In one or more specific aspects, as may be appreciated by one of skill in the art upon viewing this disclosure, a casing string or liner, such as casing string 111, may generally include a pipe or tubular, which may include a plurality of joints or sections, and which may be placed within the wellbore for the purpose of maintaining formation integrity, preventing collapse of the wellbore, controlling formation fluids, preventing unwanted losses of fluid to the formation, or the like. As such, the casing string 111 may be configured to prevent unintended fluid communication between the axial flowbore and the formation 102.

While the exemplary operating environment depicted in FIGS. 1A and 1B refers to a stationary drilling rig 103 for accessing a land-based wellbore 101, one of ordinary skill in the art will readily appreciate that mobile workover rigs, wellbore servicing units (e.g., coiled tubing units), and the like may be used for accessing the wellbore 101. It should be understood that the PMT method may alternatively be used in other operational environments, such as within an offshore wellbore operational environment.

Referring to the aspect of FIGS. 1A and 1B, the wellbore 101 may have been drilled into the subterranean formation 102 as previously described herein.

In one or more specific aspects, the wellbore may include two or more wellbore tubulars (e.g., casing strings, work strings, etc.) at least a portion of a first wellbore tubular being concentrically positioned within at least a portion of a second wellbore tubular. Referring to the aspect of FIGS. 1A and 1B, the wellbore 101 includes a tubular work string 113 positioned within the casing string 111. In one or more specific aspects, the tubular work string 113 includes a coiled tubing, a stick pipe, an open ended production tubing, a casing string, a liner, a production string, a completion string, a drill string, a tool string, a tubing string, a segmented tubing string, a jointed tubing string, or another suitable type of string, or combinations thereof.

In one or more specific aspects, the tubular work string 113 includes at least a portion of a servicing tool that may be located at the end of the tubular work string 113 that is positioned in the proximity of the producing zone 107. In such aspect, the end of the tubular work string 113 may be configured to deliver fluids with different properties, i.e., different viscosities, different flow rates, etc.

The wellbore 101 configuration including a tubular work string 113 positioned within the casing string 111 leads to two distinct flowpaths (i.e., annular flowpath 114 and tubular flowpaths 115) that are isolated from each other until they reach a portion of the wellbore proximate the producing zone 107. In one or more specific aspects, the annular flowpath 114 includes the annular space between the tubular work string 113 and the casing string 111 (e.g., as shown by annular flowpath arrow 116). In one or more specific aspects, the tubular flowpath 115 includes the flow space within the tubular work string 113 (e.g., as shown by tubular flowpath arrow 117).

Referring to the aspect of FIGS. 1A and 1B, a fluid (e.g., a wellbore servicing fluid including a coated proppant as described herein) may be introduced into the annular flowpath 114 using any suitable methodology (e.g., pumping). A fluid present in the annular flowpath 114 may be referred to as an annular fluid. In one or more specific aspects, the annular fluid flowpath may follow annular flowpath arrow 116.

Referring to the aspect of FIGS. 1A and 1B, a fluid (e.g., a wellbore servicing fluid including a coated proppant as described herein) may be introduced into the tubular flowpath 115 using any suitable methodology (e.g., pumping). A fluid present in the tubular flowpath 115 may be referred to as a tubular fluid. In one or more specific aspects, the tubular fluid flowpath may follow tubular flowpath arrow 117.

In some aspects, a flowpath into the formation may be established by providing one or more perforations and/or perforation clusters (e.g., a plurality of associated or closely-positioned perforations) in the casing string 111. In one or more specific aspects, the casing, cement sheath, and/or surrounding formation are perforated to provide a flowpath and associated route of fluid communication from the wellbore into the surrounding formation. Perforations generally refer to openings extending through the walls of a casing and/or liner, through the cement sheath surrounding the casing or liner (when present), and, in some aspects, into the formation.

Perforations may be formed using any suitable methodology or apparatus. For example, In one or more specific aspects, the perforations may be formed by a fluid jetting apparatus (e.g., a hydrajetting tool). A suitable fluid jetting apparatus and the operation thereof is described in more detail in U.S. Publication Nos. 2011/0088915, 2010/0044041, and U.S. Pat. No. 7,874,365, each of which is incorporated by reference herein in its entirety. Additionally or alternatively, perforations may be provided via explosive charges such as shaped charges.

Referring to FIGS. 1A and 1B, the end of the tubular work string 113 includes an aspect of a fluid jetting apparatus 120 and is illustrated in operation within the wellbore 101. In the aspect of FIGS. 1A and 1B, the fluid jetting apparatus 120 is selectively configurable to deliver a relatively low-volume, relatively high-pressure fluid stream (e.g., as would be suitable for a perforating operation, as seen in FIG. 1A) or to deliver a relatively high-volume, relatively low-pressure fluid stream (e.g., as would be suitable for a fracturing operation, as seen in FIG. 1B).

In the aspect of FIG. 1A, the fluid jetting apparatus 120 is configured for a perforating operation, for example, by introducing an obturating member 122 (e.g., via a ball, foam dart, mechanical dart, etc.) into the tubular work string 113 and forward-circulating the obturating member 122 to engage a seat or baffle 121 within the fluid jetting apparatus 120 and thereby configure the fluid jetting apparatus 120 for the perforating operation (e.g., by providing a route of fluid communication via one or more fluid jetting orifices 123 and by obscuring a route of fluid communication via one or more relatively high-volume fracturing ports 137). Upon engaging the seat 121, such an obturating member 122 may substantially restrict or impede the passage of fluid from one side of the obturating member to the other. The fluid jetting apparatus 120 may be positioned proximate and/or substantially adjacent to the formation zone into which a perforation is to be introduced (e.g., fracturing interval 2, as illustrated in the aspect of FIG. 1A) and a suitable perforating fluid may be pumped via the tubular flowpath 115 of the tubular work string 113 to the fluid jetting apparatus 120. In various aspects, the tubular fluid including a perforating fluid (e.g., a WSC-CE) may include a particulate and/or abrasive material (e.g., proppant, sand, steel fines, glass particles, and the like). The perforating fluid may be pumped at rate and/or pressure such that the fluid is emitted from the fluid jetting apparatus 120 via the fluid jetting orifices 123 (e.g., jets, nozzles, erodible nozzles, or the like), as shown by tubular flowpath arrows 124, at a rate and/or pressure sufficient to erode, abrade, and/or degrade walls of the adjacent and/or proximate casing string 111, and/or the cement sheath 112 surrounding the casing string 111, and thereby forming one or more perforations 130. The perforating fluid may be returned to the surface via the annular flowpath 114.

In an alternative aspect, the perforations 130 may be formed by the operation of a perforating gun. Such a perforating gun may be configured to selectively detonate one or more explosive charges thereby penetrating the walls of the casing string 113 or liner and/or cement 112 and so as to create the perforation 130. A suitable perforating gun may be conveyed into position within the wellbore via a workstring (e.g., a coiled tubing string), a wireline, a tractor, or by any other suitable means of conveyance. In such an aspect, the perforating gun may be lowered into the wellbore, for example, suspended from a work string like the tubular work string 113 or a wireline, and actuated (e.g., fired) to form perforations. In still another aspect, a casing string 111 or liner may be perforated prior to placement within a wellbore 101.

In an alternative aspect, a perforation includes a casing window and/or casing door assembly, for example having actuatable windows (e.g., sliding sleeves) that are selectively configurable to provide a route of fluid communication from the interior of the wellbore to the surrounding formation. In such aspects, the casing string 111 typically is not cemented within the wellbore 101, and the casing string 111 may also include a plurality of packers (e.g., mechanical packers or swellable packers, such as SwellPackers™, commercially available from Halliburton Energy Services), typically positioned on the exterior of the casing in the annulus between the casing and the wellbore wall and utilized to secure the casing string 111 within the wellbore 101 and to isolate adjacent fracturing intervals (e.g., fracturing interval 1 from fracturing interval 2, etc.) of the wellbore 101 and/or adjacent formation zones. The casing window assembly may generally refer to an assemblage, which may be incorporated within a casing string or liner, and which may be configurable to provide a route of fluid communication between the axial flowbore of the casing and an exterior of the casing. In one or more specific aspects, the casing windows may be activatable and/or deactivatable, for example, such that the casing windows are selectively configurable to allow and/or disallow fluid communication. For example, a casing window assembly may generally include a housing having one or more ports providing a route of fluid communication between the axial flowbore of the casing and an exterior of the casing dependent upon the positioning of a sliding sleeve. The sliding sleeve may be movable, relative to the housing, from a first position (e.g., a closed position), in which the sliding sleeve obstructs the ports, to a second position (e.g., as open position), in which the sliding sleeve does not obstruct the ports. Additionally, In one or more specific aspects, the ports may be fitted with a suitable fluid-pressure altering device (e.g., jets, nozzles, erodible nozzles, or the like), for example, such that fluid communication via the fluid-pressure altering device may erode and/or degrade a portion of the formation and/or, when present, a cement sheath surrounding the casing window assembly (e.g., in aspects where a cement sheath is present).

In various aspects, the casing windows may be activatable and/or deactivatable by any suitable method or apparatus. For example, in various aspects, a casing window assembly may be activatable or deactivatable, (e.g., by transitioning the sliding sleeve from the first to the second position or from the second to the first position) via one or more of a mechanical shifting tool, an obturating member (e.g., a ball or dart), a wireline tool, a pressure differential, a rupture disc, a biasing member (e.g., a spring), or combinations thereof. In alternative aspects, a casing window assembly may be activated and/or deactivated by any suitable method or apparatus. Suitable methods and apparatuses may be appreciated by one of skill in the art upon viewing this disclosure.

Referring to the aspect of FIG. 1B, when there is no obturating member engaged in the seat 121, the tubular fluid is forced to exit the tubular flowbore 115 via the tubular seat flowbore 126, as shown by tubular flowpath arrow 127. In such aspect, the tubular fluid will meet the annular fluid in the zone of fluid communication 119, and the two fluids will mix as shown by mixing arrows 128 in FIG. 1B. While in the aspect of FIG. 1B the tubular fluid is designed to exit the tubular working string 113 via the tubular seat flowbore 126, as shown by the tubular flowpath arrow 127, some tubular fluid might exit the tubular working string 113 via the tubular fluid jetting orifices 123 and mix with the annular fluid adjacent and/or downstream from the orifices 123.

While the aspects of FIGS. 1A and 1B only display two fracturing intervals in the producing zone 107, the producing zone may include 1, 2, 3, 4, 5, 6, 7, 8, 9, 10, 11, 12, or more fracturing intervals.

In various aspects, the WSC-CE may be introduced to newly completed wellbores, previously completed wellbores that have not been previously stimulated or subjected to production, previously completed wellbores that have not been previously stimulated but have been previously subjected to production, wellbores that have been previously stimulated and have been previously subjected to production, or combinations thereof.

EXAMPLES

The subject matter of the present disclosure having been generally described, the following examples are given as particular aspects thereof and to demonstrate the practice and advantages thereof. It is understood that the examples are given by way of illustration and are not intended to limit the specification or the claims in any manner.

Example 1

A coating composition of the type disclosed herein was prepared. One gallon per thousand gallons (gpt) of a friction reducer (e.g., FR-76) was added to distilled ionized (DI) water to form a friction reducer solution (e.g., also referred to as slick water). The friction reducer solution (200 ml) was placed in a Waring blender to which was added 96 g of sand to make up a slurry of 4 ppg sand. With constant mixing, 1 ml of surface modification agent (SMA) emulsion was added to slurry present in the Waring blender to give an amount of 1 wt. % SMA with respect to sand. Following addition of the SMA emulsion, 1 ml of emulsion breaker was added and the resultant slurry was allowed to mix for 1 minute at room temperature. The friction reducing agent (e.g., FR-76) and SMA (e.g., SANDWEDGE® ABC conductivity enhancement services) are commercially available from Halliburton Energy Services. The sand was 20/40 UNIMIN commercially available from UNIMIN corporation.

Figure 2A:
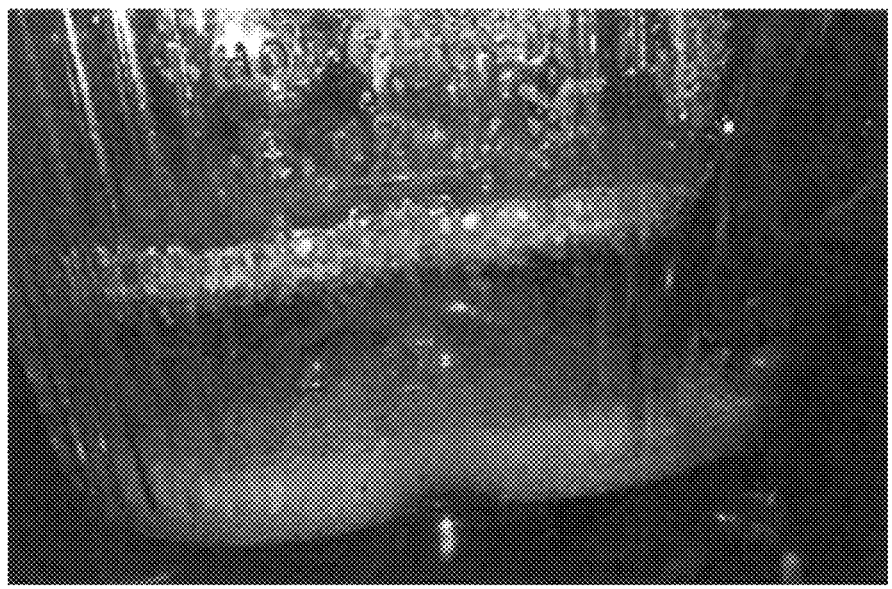
FIGS. 2A and 2B are photos of samples prepared according to Example 1.
Figure 2B:
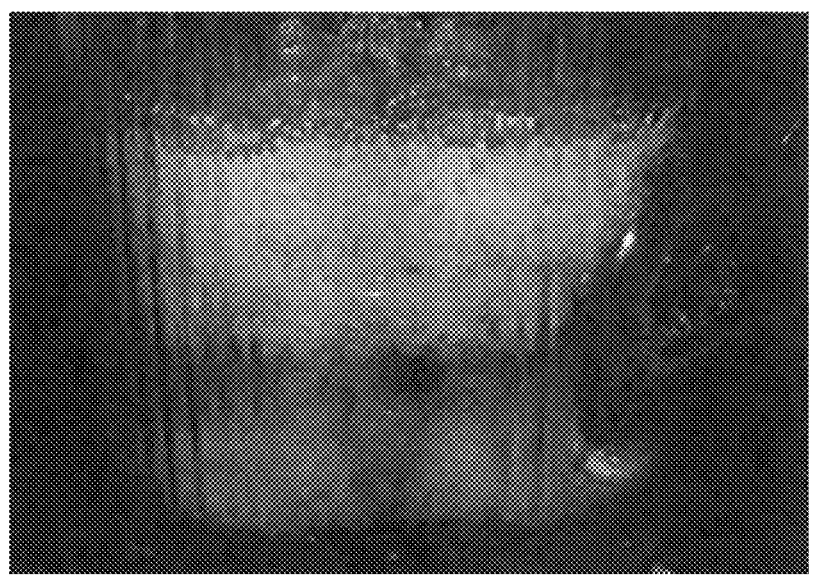

A reference sample was prepared containing 4 ppg of sand and friction reducer. To the sample was added 1 wt. % surface modification agent (SMA) emulsion, in the absence of emulsion breaker. The resulting slurry was allowed to mix for 1 minute at room temperature. Upon stopping the stirring, it was observed that with the addition of emulsion beaker, sand particles were effectively coated by the SMA, evident by the "fluffiness" and "suspended-sand" of sand pack due to hydrophobic repulsion between sand grains imparted by the presence of the SMA coating on the surface of the sand particles. Referring to FIG. 2A, the sample without the emulsion breaker, the reference sample, does not have the sand consolidated or formed into a coherent associated mass. In contrast, FIG. 2B demonstrates that the proppant, now coated with the SMA, the inventive sample forms a coherent mass.

Example 2

Figure 3:
FIG. 3 is a photo of samples prepared according to Example 2.

The effectiveness of the SMA coating was further demonstrated by mixing friction reducer solution and sand to make a slurry of 4 ppg sand. Friction reducer solution was then decanted off the slurry. The treated sand was transferred into a glass jar and filled with water. To the jar containing treated sand, 0.2 g of silica flour (SSA) was added to simulate formation fines. Referring to FIG. 3, a photo comparison of the material with the addition of emulsion breaker (inventive sample, right) demonstrates how fines particles were caught on the sand surface leaving a clear water layer compared to where the sand was not treated (reference sample, left) resulting in the fine particles not being caught and leaving cloudy water in the jar.

Comparative Example

An emulsion having 40% water in oil was prepared. 1 ml of an emulsion breaker of the present disclosure was added to the emulsion and the mixture was left stirring overnight at room temperature. No break in the emulsion was observed demonstrating the material was not able to break a water in oil emulsion.

ADDITIONAL DISCLOSURE

The following are additional enumerated aspects of the concepts disclosed herein.

The following are additional enumerated aspects of the concepts disclosed herein.

A first aspect which is a method, comprising contacting a proppant, water, and a water external emulsion to form a mixture, wherein the water external emulsion has an organic internal phase comprising a surface modifying agent; contacting the mixture with an emulsion breaker to form a wellbore servicing fluid comprising a proppant coated with the surface modifying agent; and placing the wellbore servicing fluid in a wellbore penetrating a subterranean formation.

A second aspect which is method, comprising contacting a proppant, water, and a water external emulsion to form a first mixture, wherein the water external emulsion has an organic internal phase comprising a surface modifying agent; contacting the first mixture with an emulsion breaker to form second mixture comprising a proppant coated with the surface modifying agent; and recovering a coated proppant from the second mixture.

A third aspect which is the method of any of the first through second aspects wherein the proppant and water are contacted prior to contact with the water external emulsion to form the mixture.

A fourth aspect which is the method of any of the first through third aspects wherein the water external emulsion and the water are contacted prior to contact with the proppant to form the mixture.

A fifth aspect which is the method of any of the first through fourth aspects further comprising adding a friction reducer prior to contact of the mixture with the emulsion breaker.

A sixth aspect which is the method of any of the first through fourth aspects further comprising adding a friction reducer concurrent with or subsequent to contact of the mixture with the emulsion breaker.

A seventh aspect which is the method of the third aspect further comprising adding a friction reducer prior to or concurrent with contact of the proppant and the water.

An eighth aspect which is the method of the fourth aspect further comprising adding a friction reducer prior to or concurrent with contact of the water external emulsion and the water.

A ninth aspect which is a method, comprising contacting water and a friction reducer to form a first mixture; contacting the first mixture with a proppant to form a second mixture; contacting the second mixture with a water external emulsion to form a third mixture, wherein the water external emulsion has an organic internal phase comprising a surface modifying agent; contacting the third mixture with an emulsion breaker to form a wellbore servicing fluid comprising a proppant coated with the surface modifying agent; and placing the wellbore servicing fluid in a wellbore penetrating a subterranean formation.

A tenth aspect which is the method of the second aspect further comprising transporting the coated proppant to a location proximate the wellbore; contacting the coated proppant with water to form a wellbore servicing fluid comprising the coated proppant; and placing the wellbore servicing fluid in a wellbore penetrating a subterranean formation.

An eleventh aspect which is the method of any of the first through fourth aspects wherein the wellbore servicing fluid further comprises a friction reducer.

A twelfth aspect which is the method of any of the fifth through ninth aspects or eleventh aspect wherein the friction reducer is selected from the group consisting of an anionic polymer, a cationic polymer, a non-ionic polymer, an amphoteric polymer and any combination thereof.

A thirteenth aspect which is the method of any of the fifth through ninth aspects or eleventh aspects wherein the friction reducer is selected from the group consisting of a polyacrylamide, a polyacrylamide derivative, a polyacrylamide co-polymer and any combination thereof.

A fourteenth aspect which is the method of any of the fifth through ninth aspects or eleventh through thirteenth aspects wherein the friction reducer is present in an amount of from about 0 gpt (gallon per thousand) to about 10 gpt based on the total volume of the wellbore servicing fluid.

A fifteenth aspect which is the method of any of first through fourteenth aspects wherein the SMA comprises a tackifying compound, a resin coating, or both.

A sixteenth aspect which is the method of any of the first through fifteenth aspects wherein the organic internal phase comprises isopropyl alcohol, glycol ether, butyl glycidyl ether, cresol glycidyl ether, alkyl glycidyl ether, phenyl glycidyl ether or any other glycidyl ether ethyl acetate, butyl lactate, ethyl lactate, amyl acetate, ethylene glycol diacetate, propylene glycol diacetate or any combination thereof, and the SMA comprises one or more compounds selected from the group consisting of hydrophobically modified polyamines, polyimines, polyamides, polyvinyl alcohol, polyurethane, polyacrylic, epoxy resin, poly(methyl methacrylate) (PMMA), polyoxymethylene (POM), polyvinyl chloride, polyester resins and any combination thereof.

A seventeenth aspect which is the method of any of the first through sixteenth aspects wherein a ratio of water external emulsion:emulsion breaker is from about 1:1 to about 1:0.2.

An eighteenth aspect which is the method of any of first through seventeenth aspects wherein the SMA is present on the coated proppant in an amount of from 0.1 wt. % to about 2 wt. % based on a total weight of the proppant.

A nineteenth aspect which is the method of any of the first through eighteenth aspects wherein the emulsion breaker comprises inorganic particles selected from the group consisting of silica particles, alumina particles and any combination thereof.

A twentieth aspect which is the method of the nineteenth aspect wherein the inorganic particles have a particle size ranging from about 0.1 microns to about 100 microns.

A twenty-first aspect which is the method of any of the first through twentieth aspects wherein the emulsion breaker comprises a fumed silica.

A twenty-second aspect which is the method of any of the first through twenty-first aspects wherein the emulsion breaker has a density of from about 1.0 g/cm$^3$ to about 1.5 g/cm$^3$.

A twenty-third aspect which is the method of any of the first through twenty-second aspects wherein the proppant is selected from the group consisting of silica (sand), graded sand, Ottawa sands, Brady sands, Colorado sands; gravels; synthetic organic particles, nylon pellets, high density plastics, teflons, rubbers, resins; ceramics, aluminosilicates; glass; sintered bauxite; quartz; aluminum pellets; ground or crushed shells of nuts, walnuts, pecans, almonds, ivory nuts, brazil nuts, ground or crushed seed shells of seeds of fruits; ground or crushed seed shells of other plants; crushed fruit pits or processed wood materials, materials derived from woods; and any combination thereof.

A twenty-fourth aspect which is the method of any of the first through twenty-third aspects wherein proppant is present in an amount of from about 2 wt. % to about 50 wt. %, based on a total weight of the wellbore servicing fluid.

A twenty-fifth aspect which is a wellbore servicing composition, comprising a proppant, water, a water external emulsion, a friction reducer and an emulsion breaker, wherein the water external emulsion has an organic internal phase comprising a surface modifying agent.

A twenty-sixth aspect which is the wellbore servicing composition of the twenty-fifth aspects wherein the emulsion breaker comprises inorganic particles.

A twenty-seventh aspect which is the method of any of the twenty-fifth through twenty-sixth aspects wherein the organic internal phase comprises isopropyl alcohol, glycol ether, butyl glycidyl ether, cresol glycidyl ether, alkyl glycidyl ether, phenyl glycidyl ether or any other glycidyl ether ethyl acetate, butyl lactate, ethyl lactate, amyl acetate, ethylene glycol diacetate, propylene glycol diacetate or any combination thereof.

A twenty-eight aspect which is a wellbore servicing composition, comprising a proppant, water, a surface modification agent, and an emulsion breaker, wherein the emulsion breaker comprises inorganic particles.

A twenty-ninth aspect which is a wellbore servicing composition of any of the twenty-fifth through twenty-eighth aspects wherein the emulsion breaker comprises fumed silica.

A thirtieth aspect which is the wellbore servicing composition of any of the twenty-fifth through twenty-ninth aspects wherein the SMA comprises one or more compounds selected from the group consisting of hydrophobically modified polyamines, polyimines, polyamides, polyvinyl alcohol, polyurethane, polyacrylic, epoxy resin, poly (methyl methacrylate) (PMMA), polyoxymethylene (POM), polyvinyl chloride, polyester resins and any combination thereof.

While aspects of the disclosed subject matter have been shown and described, modifications thereof can be made by one skilled in the art without departing from the spirit and teachings of the disclosed subject matter. The aspects described herein are exemplary only, and are not intended to be limiting. Many variations and modifications of the disclosed subject matter are possible and are within the scope of the disclosed subject matter. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprising, includes, having, etc. should be understood to provide support for narrower terms such as consisting of, consisting essentially of, consisting substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosed subject matter. Thus, the claims are a further description and are an addition to the aspects of the presently disclosed subject matter. The discussion of a document herein is not an admission that it is prior art to the presently disclosed subject matter, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method, comprising:
    contacting a proppant, water, and a water external emulsion to form a mixture, wherein the water external emulsion has an organic internal phase comprising a surface modifying agent;
    contacting the mixture with an emulsion breaker to form a wellbore servicing fluid comprising a proppant coated with the surface modifying agent, wherein the emulsion breaker comprises inorganic particles selected from the group consisting of silica particles, alumina particles and any combination thereof; and
    placing the wellbore servicing fluid in a wellbore penetrating a subterranean formation.

2. The method of claim 1 wherein the proppant and water are contacted prior to contact with the water external emulsion to form the mixture.

3. The method of claim 1 wherein the water external emulsion and the water are contacted prior to contact with the proppant to form the mixture.

4. The method of claim 1 further comprising adding a friction reducer prior to contact of the mixture with the emulsion breaker.

5. The method of claim 1 further comprising adding a friction reducer concurrent with or subsequent to contact of the mixture with the emulsion breaker.

6. The method of claim 1 further comprising adding a friction reducer prior to or concurrent with contact of the proppant and the water.

7. The method of claim 1 further comprising adding a friction reducer prior to or concurrent with contact of the water external emulsion and the water.

8. The method of claim 1, wherein the organic internal phase comprises isopropyl alcohol, glycol ether, butyl glycidyl ether, cresol glycidyl ether, alkyl glycidyl ether, phenyl glycidyl ether or any other glycidyl ether ethyl acetate, butyl lactate, ethyl lactate, amyl acetate, ethylene glycol diacetate, propylene glycol diacetate or any combination thereof, and the SMA comprises one or more compounds selected from the group consisting of hydrophobically modified polyamines, polyimines, polyamides, polyvinyl alcohol, polyurethane, polyacrylic, epoxy resin, poly(methyl methacrylate) (PMMA), polyoxymethylene (POM), polyvinyl chloride, polyester resins and any combination thereof.

9. A method, comprising:
contacting water and a friction reducer to form a first mixture;
contacting the first mixture with a proppant to form a second mixture;
contacting the second mixture with a water external emulsion to form a third mixture, wherein the water external emulsion has an organic internal phase comprising a surface modifying agent;
contacting the third mixture with an emulsion breaker to form a wellbore servicing fluid comprising a proppant coated with the surface modifying agent (SMA), wherein the emulsion breaker comprises inorganic particles selected from the group consisting of silica particles, alumina particles and any combination thereof; and
placing the wellbore servicing fluid in a wellbore penetrating a subterranean formation.

10. The method of claim 9, wherein the friction reducer is selected from the group consisting of an anionic polymer, a cationic polymer, a non-ionic polymer, an amphoteric polymer and any combination thereof.

11. The method of claim 9, wherein the friction reducer is selected from the group consisting of a polyacrylamide, a polyacrylamide derivative, a polyacrylamide co-polymer and any combination thereof.

12. The method of claim 9, wherein the friction reducer is present in an amount of from about 0 gpt (gallon per thousand) to about 10 gpt based on the total volume of the wellbore servicing fluid.

13. The method of claim 9, wherein the SMA comprises a tackifying compound, a resin coating, or both.

14. The method of claim 9, wherein:

the organic internal phase comprises isopropyl alcohol, glycol ether, butyl glycidyl ether, cresol glycidyl ether, alkyl glycidyl ether, phenyl glycidyl ether or any other glycidyl ether ethyl acetate, butyl lactate, ethyl lactate, amyl acetate, ethylene glycol diacetate, propylene glycol diacetate or any combination thereof, and the SMA comprises one or more compounds selected from the group consisting of hydrophobically modified polyamines, polyimines, polyamides, polyvinyl alcohol, polyurethane, polyacrylic, epoxy resin, poly(methyl methacrylate)(PMMA), polyoxymethylene (POM), polyvinyl chloride, polyester resins and any combination thereof.

15. The method of claim 9, wherein a ratio of water external emulsion:emulsion breaker is from about 1:1 to about 1:0.2.

16. The method of claim 9, wherein the SMA is present on the coated proppant in an amount of from 0.1 wt. % to about 2 wt. % based on a total weight of the proppant.

17. The method of claim 9, wherein the inorganic particles have a particle size ranging from about 0.1 microns to about 100 microns.

18. The method of claim 9, wherein the emulsion breaker comprises a fumed silica.

19. The method of claim 9, wherein the proppant is selected from the group consisting of silica (sand), graded sand, Ottawa sands, Brady sands, Colorado sands; gravels; synthetic organic particles, nylon pellets, high density plastics, teflons, rubbers, resins; ceramics, aluminosilicates; glass; sintered bauxite; quartz; aluminum pellets; ground or crushed shells of nuts, walnuts, pecans, almonds, ivory nuts, brazil nuts, ground or crushed seed shells of seeds of fruits; ground or crushed seed shells of other plants; crushed fruit pits or processed wood materials, materials derived from woods; and any combination thereof.

20. The method of claim 9, wherein proppant is present in an amount of from about 2 wt. % to about 50 wt. %, based on a total weight of the wellbore servicing fluid.

* * * * *